Oct. 22, 1940.　　　　A. KALIN　　　　2,219,229
GOVERNOR
Filed Aug. 3, 1940　　　3 Sheets-Sheet 1

FIG-1

INVENTOR.
ALBERT KALIN
BY George M. Soule
ATTY.

FIG-6

Patented Oct. 22, 1940

2,219,229

UNITED STATES PATENT OFFICE 2,219,229

GOVERNOR

Albert Kalin, Cleveland, Ohio

Application August 3, 1940, Serial No. 350,254

8 Claims. (Cl. 121—41)

This invention relates to a governor for regulating the operation of power driven mechanisms. The illustrated embodiments are adapted especially for regulating speed, e. g., of prime movers as by controlling the rate of input of energy media thereto. Other uses for the invention will be apparent from the illustrative showing.

Governors of the type shown—adapted for speed regulation of prime movers and other machinery—have, as the primary weighing element, a fly-ball mechanism rotatably mounted and connected with a rotary part of the machine to be governed, the condition of which fly-ball mechanism varies according to the speed of the rotary part. This variation can be utilized effectively through the agency of a hydraulic relay system including a single or double acting hydraulic servo-motor, valves and additional means ("compensating" means,—explained below) by controlling the flow of hydraulic fluid to and from the servo motor, to regulate the rate of flow of energy medium to the prime mover, thus to maintain substantially constant speed of such prime mover notwithstanding variations in load imposed thereon.

The efficiency and accuracy of operation of such governors in reestablishing the desired speed of a prime mover after each load change depends largely on the sensitivity of the valve and compensation mechanism or apparatus which are utilized in controlling the hydraulic system, first to effect movement of the servo motor in the proper direction to offset the change in condition of the governed mechanism,—as a decrease or increase in load on a prime mover and resulting increase or decrease in speed thereof—, and then to prevent overtravel of the driven element of the servo-motor so as not to effect over-correction. The first action, namely that which may be used to adjust such input of energy medium to a prime mover is referred to as regulation. The second,—that which prevents over-correction in the necessary direction to meet the changed condition of the mechanism to be governed—, is called compensation. Compensation is required for dampening transitory phenomena accompanying and immediately following changes in the condition governed, for instance, speed change. Compensation can be either primary compensation only or primary compensation followed by secondary compensation. Primary compensation without secondary compensation results in a permanent change of the speed setting of the governor. Primary compensation with secondary compensation results in a temporary change only of the speed setting.

In fly-ball actuated governors utilizing hydraulic means for regulation and compensation, the primary regulating or pilot valve of the hydraulic system usually includes a plunger which slides in or against a cooperating valve element to control the hydraulic fluid; and such plunger is ordinarily coaxial with the fly-ball mounting so that it can be reciprocated directly by the fly-ball mechanism. In order to eliminate or reduce static friction, since during normal operation or steady-state condition there is no axial movement of the plunger, provision has been made to cause circumferential movement between the valve plunger and its guide as by turning the guide by the fly-ball mechanism and holding the plunger against turning. Thereby, when relative axial movement between the plunger and its guide becomes necessary, the parts, being already in relative motion, are free and there is no lagging due to having to overcome static friction or "sticking." The parts have to be fairly closely fitted in order to reduce leakage or slip of hydraulic fluid to a practical minimum, and because of this a very slight accumulation of solid matter between the coacting sliding surfaces can and frequently does cause sticking unless the parts are kept in relative motion as by relative rotation during such steady-state conditions of the governor. Compensation can be effected hydraulically by means of a hydraulic lever which includes an actuating piston and cylinder operated by the servo-motor and a receiving piston and cylinder, which receiving piston and cylinder act (compensatingly) on an element of the valve to close the port or ports after the same have been opened by the weighing element, thus limiting the action of the servo-motor. Such receiving compensating pistons, in fly-ball governors, have also been arranged coaxially with the fly-ball mounting and valve plunger. The previous arrangements, however, did not provide for positive relative rotation of the receiving compensating piston and its guide whereby further to overcome static friction. The present invention does. This indicates one object hereof.

The previous arrangements in which the receiving compensating piston and sliding valve plunger were coaxially arranged required, in addition to the pilot valve plunger, an axially movable compensating valve part (i. e. a compensating valve sleeve where the pilot valve plunger was the central element of the valve, or a central compensating valve part where the pilot valve plunger was in the form of a sleeve valve element surrounding the compensating valve part). The receiving compensating piston acted on the (e. g.) compensating sleeve to counteract or offset valving movements of the pilot valve plunger,—after the latter has been moved to initiate actuation of the servo-motor—, thus performing a primary compensating operation. Secondary compensation was secured by subsequently returning the compensating sleeve to its original, i. e. normal position in unison with the return of the plunger to normal position. The additional valve part complicated the construction, increased the total sliding friction incident to the regulating and compensating operations, and made it necessary to use a strong re-positioning (e. g. centering) spring or set of springs in order to insure the final return of the additional valve part to normal position after each actuation.

Another object is to eliminate the additional sliding valve part and re-positioning spring device therefor.

The coaxial arrangement of the pilot valve plunger and compensating piston, while simplifying and unifying the hydraulic apparatus and permitting the valve plunger to be kept in a state of rotation relative to its sliding guide or valve port cylinder, introduced other problems which have not heretofore been solved in a satisfactory manner. The sliding valve part which was provided in addition to the pilot valve plunger when said part was in the form of a sleeve, was necessarily larger than the plunger and the receiving compensating piston which was connected rigidly to the sleeve had to be made still larger. Reversal of parts, i. e. making the pilot valve plunger in the form of a sleeve and the compensating valve part slidable in such sleeve still required a piston larger than the outer diameter of the pilot valve plunger (sleeve). The result was that very expensive machining operations were necessary in order to maintain absolute concentricity of the cylinder bores for the compensating valve part, the compensating piston, and the pilot valve plunger, and the piston and compensating valve unit had to be assembled into place from opposite ends of the hydraulic unit. If the alignment of cylinder bores was not absolute, then sticking or freezing of the piston and compensating valve part in their guide bores resulted.

The present arrangement does not require absolute alignment of the compensating piston cylinder or guide and the guide for the valve element upon which force is imposed axially by the piston in effecting compensation. Also the present arrangement does not require different sized bores for the compensating piston and the sliding valve element compensatingly restrained thereby. Particularly, it does not require a piston which is larger than the sliding valve part to which connected, wherefore the piston and said part can be put into place and removed readily as a self contained assembly or unit as will be more fully explained below. The above indicates further objects of the present invention.

The objects include, specifically, the provision of a governor in which a pilot valve plunger element of a hydraulic relay and one element of a compensation piston and cylinder couple are connected in such manner that the plunger and said latter element can be maintained in a state of rotation relative to the cooperating elements of the pilot valve and said couple, respectively, during steady state and transient conditions of the governor, simply by driving (or holding) one of the connected elements; the provision of a governor of the type herein shown, in which primary compensation is effected by force imparted axially to one element of a hydraulic relay pilot valve plunger and cooperating valve sleeve by one element of a piston and cylinder couple, which latter elements are maintained in relative rotation at all times, and the provision of means using hydraulic or other fluid to effect primary and secondary compensation in an isochronous governor, which means is not subject to being rendered unsensitive or less sensitive at times by static friction.

Another object is to provide a governor utilizing hydraulic regulation through a servo-motor and compensation means acting hydraulically as a function of servo-motor movement, wherein the volume of hydraulic fluid displaced by the servo-motor and the load imposed thereon for compensation purposes are reduced substantially to a minimum, and wherein gas or air is not likely to become trapped in the hydraulic system at such regions as could cause faulty operation.

A further object is to provide a governor which will operate in a more flexible manner under all practical conditions of use than those of its type heretofore proposed or used, which is provided with effective lubrication means, which will be simple and easy to construct, unlikely to get out of operating condition, and which will reduce hunting or vacillation incident to change in the operation governed.

Other objects and novel features of the invention will be brought out in connection with the following description of the illustrative embodiments shown in the drawings:

Preferred form

Figure 1:
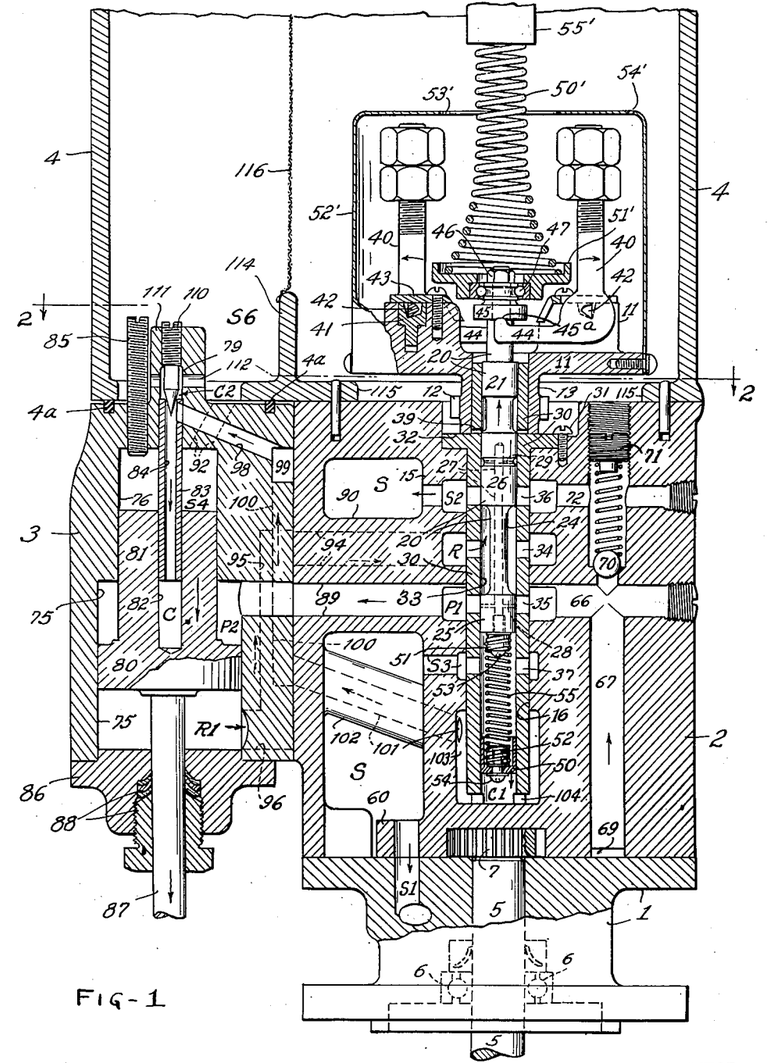
Fig. 1 is a vertical sectional view centrally cutting the main operating parts of the governor.
Figures 2, 3, 4, 5:
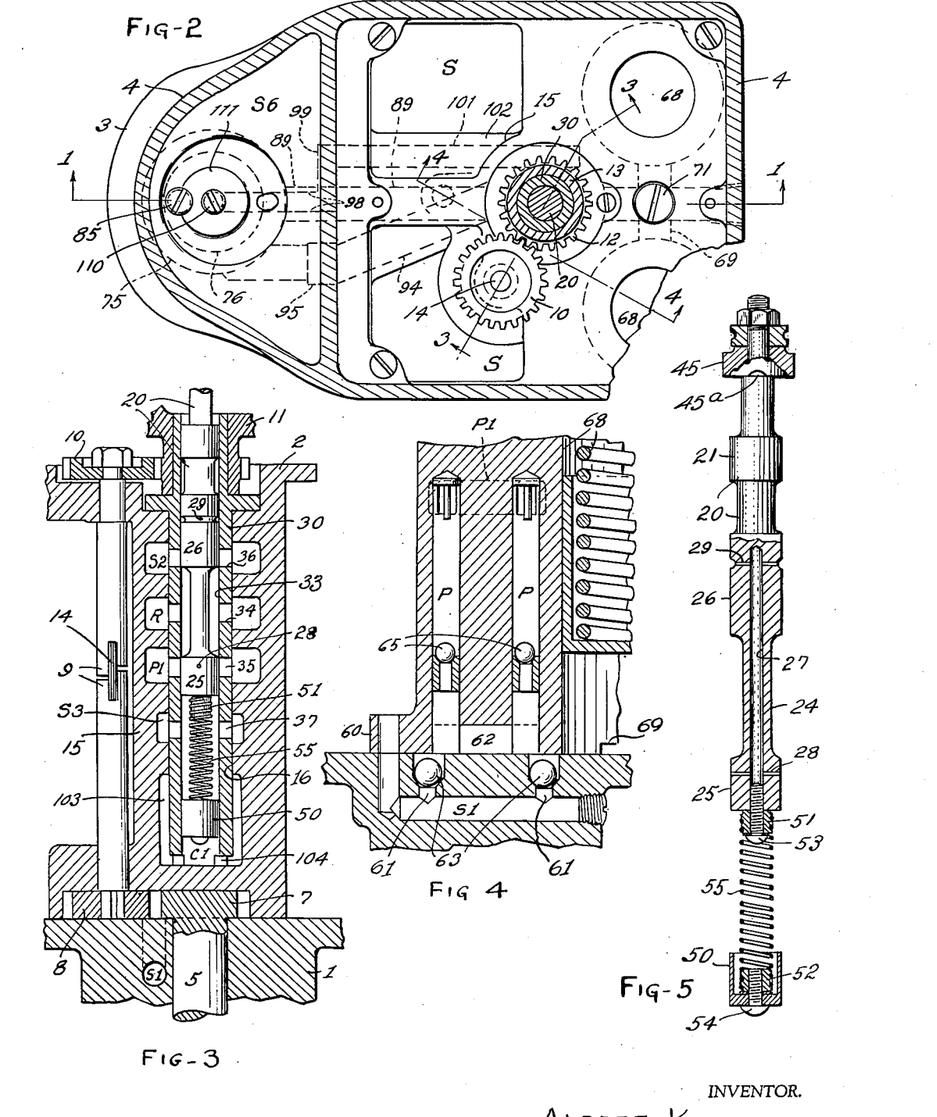
Fig. 2 is a sectional plan view as though taken along the line 2—2 on Fig. 1.
Fig. 3 is a detail vertical sectional view taken along the line 3—3 on Fig. 2, showing the manner of driving the fly-ball head and an illustrative means of generating and accumulating hydraulic pressure fluid.
Fig. 4 is a detail vertical sectional view taken along the line 4—4 on Fig. 2.
Fig. 5 is a longitudinal sectional view of the pilot valve and compensating piston assembly in the form shown in Fig. 1.

Referring to Figs. 1, 2 and 3, the main body parts of the governor may comprise a base or adapter 1 by which the governor is mounted, say on a prime mover to be governed, a power case 2 secured to the base, a servo-motor cylinder body 3 attached to the power case at one side thereof and a speeder case 4 surmounting the parts 2 and 3. A detachable cap (not shown) closes the upper end of the speeder case. Any appropriate means may be provided to secure the above mentioned parts together so that the joints are fluid tight. A special joint (inset compressible ring 4a) is shown between the speeder case and servo-motor body.

A shaft 5 extends through the base and can be appropriately coupled with a turning part of the mechanism to be governed. A bearing for the shaft is shown at 6. The upper end of the shaft has a gear 7 thereon which in the illustrative embodiment is one element of a gear pump and of a gear train of suitable ratio for driving the fly-ball head, the coacting gear element being shown at 8, Fig. 3. The gear 8 is rigid with a shaft 9 which, through a gear 10 on the upper side of the power case, drives a ball-head casting 11 having on its lower end a gear 12 meshing with the gear 10. The gear 12 is supported on a depending tubular extension 13 of the ball-head casting. The supporting bearing for said casting will be more fully described below. Said gears are in constant mesh and drivingly rigid with the elements on which mounted or formed. The shaft 9 may be in two sections flexibly coupled as by a device 14 which is well known in the art and the operation of which is obvious from the drawings (Fig. 3). The gear train, as shown, operates to drive the ball head casting as at the same speed and direction as that of the shaft 5 whenever the latter shaft is turned by the machine to be governed. In some cases it is desirable to arrange the gears for overdrive of the ball head.

The ball head represents one form of primary weighing element. The ball head assembly may comprise any suitable arrangement of centrifugally operated members adapted to adjust the vertical position of a pilot valve plunger 20 which, as shown, operates inside a fixed valve sleeve 30 mounted in the power case in a central tubular portion 15 of the latter. The sleeve 30 can be pressed into place in the bore 16 of the power case and secured additionally as by screws, one of which is shown at 31 adjacent an upper flange 32 of the sleeve.

In the particular arrangement shown the pilot valve plunger turns with the ball head whenever the latter is turned. The plunger may instead be held stationary while the valve sleeve is turned, as will be shown later.

Referring briefly to the ball head mechanism, ball arms 40 are shown as pivoted on knife edge bearings, including hardened V-seat blocks 41 in the head casting 11, the pivot pins 42 being retained in place by a cap 43 fastened to the head casting. The ball arm fingers 44 extend inwardly into contact with a ball finger thrust member 45 which is secured to the upper reduced end of the pilot valve plunger as by means of a nut 46 which clamps an inner bearing race ring of a ball bearing 47 and the thrust member 45 against an upwardly facing shoulder on the valve plunger. The ball arm fingers may have their inner ends seated in shallow downwardly facing depressions 45a in the thrust member 45 for the purpose of preventing the plunger from turning relative to the ball head casting. Adjustable weights 48 are attached to the upper ends of the ball arms 40 as usual in fly ball governors. A speeder spring 50' has its lower end bearing against a cupped spring seat collar 51' which contains the outer race ring of the bearing 47, the arrangement permitting the pilot valve to turn freely while the spring seat collar and speeder spring remain stationary. During operation of the governor, the upward pressure of the ball arm fingers 44 against the thrust member 45, as resisted by the downward force of the speeder spring, is great enough to cause the thrust member 45 and the pilot valve plunger 20 to be turned continuously by reason of friction of the ball arm fingers against the thrust member, wherefore the depressions 45a can be omitted if desired. The pilot valve plunger 20 is turned in the bore 33 of the sleeve 30 continuously by the ball arm fingers 44 during the entire operation of the governor.

The ball head mechanism may be partially enclosed by an inverted cup-shaped stamping or other shell 52' secured to the ball head casting and which has a central hole 53' in its top wall through which the speeder spring extends. Oil for lubrication may be supplied to the ball head mechanism through the pilot valve plunger by means to be later explained or the ball head may be kept entirely or partially immersed in oil, as desired. The shell, due to rotation with the ball head, tends to trap foreign matter on its imperforate continuous side wall. Drain openings can be provided at 54' in the top wall slightly inwardly from the inner peripheral wall of the shell.

A speeder plug is shown conventionally at 55' which may be subject to any known or suitable control for speed adjustment.

The pilot valve plunger 20 is designed to slide easily in the bore 33 of the sleeve 30 under impulses imparted by the fly balls and speeder spring as is usual and well understood in the art. The plunger has lands 21, 25 and 26 all slidably fitting the bore 33, the lands 25 and 26 functioning as plugs to cover and uncover lateral ports 35 and 36 in the sleeve 30. A relatively long neck or reduced portion 24 of the plunger separates the lands 25 and 26 and the open space so afforded communicates with lateral openings 34 in the sleeve at all times. The plunger is illustrated in the position it assumes during the steady-state running condition of the governor, both sets of ports 35 and 36 being closed. The valving functions of the lands and ports will be further described below in connection with the hydraulic system.

For the purpose of supplying oil for lubrication to the upper parts of the mechanism and particularly the foot-step bearing of the ball head casting, the plunger 20 is centrally bored from its lower end at 27 and provided with bore-intercepting lateral passages 28 which latter, as will later be seen, are subjected to constant oil pressure at the ports 35. The central bore 27 is appropriately closed at both ends axially thereof and extends upwardly to an upper portion of the land 26. There lateral passages 29 communicate the central bore with the sliding clearance space between the land 26 and the bore 33 of the sleeve. This restricts the volume of oil which may be supplied through the bore 27 to a very small amount. At the open space provided between the lands 21 and 26 lateral passages 39 are provided in the sleeve 30 for delivering oil which accumulates in said open space to the bearing surfaces between the upper end of the sleeve 30 and the depending tubular part or portion 13 of the ball head casting and which constitutes, with the upper end of the sleeve 30, the supporting mounting for the ball head casting.

The centrifugal force of the ball arms and weights, acting downwardly through the ball head casting, maintains the lower end of the tubular portion 13 normally in fairly tight pressure contact with the adjacent upper face of the flange 32 of the sleeve 30 and which provides a thrust or footstep support for the ball head mounting. Because of said pressure, there normally will be a considerable part of the oil which is supplied through the passages 39 forced upwardly along the radially contacting surfaces of the tubular portion 13 of the head casting and the upper end of the sleeve 30.

The receiving or actuated compensating piston is shown at 50, slidably arranged in a cylindrical downward extension of the bore 33 of the sleeve 30 (or a counterbore thereof in case, for any reason, a relatively larger piston is required). The receiving compensating piston is connected to the lower end of the pilot valve plunger, preferably by means permitting relative axial movement between the piston and plunger, and which at the same time constitutes a torque transmitting connection between said parts so that (e. g.) when the pilot valve is turned in the sleeve 30 the piston is also turned in its cylinder bore. The advantages of this will be later explained in detail. Said connection in the form shown comprises a fairly light coil spring 55 (say exerting in the neighborhood of .8 to 1.10 pounds pressure when compressed .1 inch). The upper end of the spring is, in effect, screw threaded onto the lower end of the valve plunger and the lower end similarly connected to the piston.

Said ends of the spring, as shown, threadingly engage respective sleeves or blocks 51 and 52 fixed on the plunger and piston, respectively. The sleeve 51 is clamped in place, as against a turnproof lock washer, by a screw 53 which also closes the small central bore 27 in the plunger, described above. The sleeve 52 is similarly secured to the compensation piston but by a screw 54 which extends upwardly from the lower face of the piston and into a threaded axial opening in the sleeve or block 52. The head of the screw 54 makes a leak proof end closure for the opening through which it extends into the piston, and can also function as a downward limit stop for the piston by engagement with a transverse partition wall (or plug) which separates the oil pump chamber in which the pump gears 7 and 8 operate from the interior of the central tubular part 15 of the power case. Members 51 and 52, being secured fixedly against turning with reference to the valve plunger and piston on which mounted, prevent substantial turning of the piston relative to the plunger, because once the spring ends are screwed onto said members, they exert an almost surprising gripping action. The piston is initially made sufficiently free in its cylinder although substantially sealed thereagainst so that the spring can turn the piston, as driven by the plunger, without appreciable torsional flexing of the spring.

The hydraulic system, as partly described above, includes a sump provided in the space generally surrounding the portion 15 of the power case and various chamber and duct portions of the apparatus which communicate freely with the sump are marked S, S1, S2, etc. An inner flange 60 on the power case (lower left, Fig. 1) has a vertical opening through it beginning well above the bottom of the settling basin of the sump proper and through which the pump is supplied (inlet to pump marked S1). The inlet bores 61 (Fig. 4) leading to the pump chamber 62 have the usual ball check valves 63; and paired outlet bores or passages P for constant pressure fluid have similar check valves at 65 as usual. Said outlet bores or passages P intercept a constant pressure space P1 cored or otherwise formed in the power case casting around the sleeve 30 adjacent the lateral ports or passages 35 thereof. Communicating with the cavity P1, as shown in Fig. 1, is a horizontal passage 66 leading, through a vertical passage 67, to spring weighted accumulator chambers 68 which are cross connected as by a recess 69 on the lower side of the case 1. The recess 69 is intercepted by the passage 67, thus supplying the accumulator chambers. The accumulators function essentially as usual in this type of apparatus, hence description is unnecessary beyond noting that pressure is maintained constant as by a spring pressed check valve 70 which, as shown, may be adjusted by a screw plug 71. The discharge passage 72 of the check valve chamber leads to the sump through a cavity S2 formed around the ports 36 of the sleeve 30. S3 is another cavity which communicates ports 37 of the sleeve 30 with the sump. Ports 37 are located between the pilot valve plunger and receiving compensating piston so that the space between the plunger and piston is always at negligible (sump head) pressure.

The servo-motor cylinder block 3 is bored on three diameters from its lower end as at 75, 76, and 78. The bore 75 is the main power cylinder bore in which is slidably carried a power piston 80. In the form shown in Fig. 1, the servo-motor is double acting. A tubular upward extension 81 of the piston slidably closes the upper end of the power cylinder at the bore 76. The extension 81 of the piston is centrally bored from its top side as at 82 to form a primary or actuating compensation cylinder for an actuating compensation piston 83 which is fixed solidly in the bore 78 against a shoulder formed by a counterbore 79 upwardly beyond the bore 78. The actuating compensating piston is hollow for its full length at 84 to form part of a delivery duct for compensation fluid leading, as will be shown below, to the receiving compensation piston and cylinder (piston 50, etc.) above described. An adjustable stop for the piston 80, engageable with the extension 81, is shown at 85 in the upper end of the block 3. The lower end of the cylinder 75 is closed by a sealed cap 86 suitably fastened to the block, and the power cylinder piston 80 has a stem 87 extending through a self sealing packing gland assembly 88 (Cheveron packing ring as shown), so tht the piston can deliver power reciprocatingly to the control gate, throttle, injector, or other regulating element of the machine to be governed, all as well understood in the art. Hydraulic fluid travels from the space P1 (around sleeve 30) to the upper part of the power cylinder 75 through a passage 89 formed partly in a bridge portion 90 of the power case 2 and partly in the power cylinder block 3.

Actuation of the piston 80 results in part from the release of fluid from the constant pressure system (from P1) through the space between the pilot valve lands 25 and 26 and surrounding spaces communicating therewith (marked R) to the lower side of the power piston portion 80 (space designated R1), when downward movement of the pilot valve opens the ports 35 in the sleeve 30. This moves the piston 80 upwardly as in order to increase speed of a prime mover governed by the mechanism. Downward movement of the power piston (slowing down of such prime mover) results from an upward movement of the pilot valve plunger and consequent release of "regulating" fluid from R and R1 by such movement of the pilot valve plunger (opening ports 36 in the sleeve 30). The opening of the ports 36 dumps regulating oil from R into the sump at S2. In accomplishing upward movement of the power piston 80, it is obvious from the drawing that with the same pressure on both sides of the piston the same will be moved upwardly by effective differential area. The cylinder space S4 above the piston extension 81 is open to a negligible pressure area through a diagonally extending passage 92 leading into the speeder case 4 as indicated on Fig. 1 in dotted lines. The force required to operate the actuating compensation cylinder and piston 82, 83 is also negligible relative to the force exerted by the power piston when moving upwardly.

Appropriate additional ducts for transfer of fluid between the pilot valve spaces mentioned and the power cylinder block spaces can be arranged as follows:—referring first to regulation fluid.

A horizontal duct 94 leads through the bridge part 90 from the space R to a vertical duct 95 formed as a channel in the attaching face of the block 3. The lower end of 95 intercepts a passage 96 leading to R1 below the piston 80.

Compensation fluid discharged from the tubular actuating compensation piston 83 (space C and bore 84) goes to a diagonally extending passage 98 in the upper end of the power cylinder block (partly in the wall of the tube 83 as shown), then to a cross channel 99 in the block 3, then down a vertical channel 100 to a bore 101 leading through another bridge portion 102 of the power case, and finally to an enlarged cavity 103 surrounding the lower end of the valve sleeve 30. Notches 104 establish communication of the enlarged cavity with the lower end of the receiving compensation cylinder, generally designated C1.

In order that the column of fluid between the compensation fluid spaces C and C1 can act as a hydraulic lever with a variable fulcrum (for primary and secondary compensation, as well understood in the art), a secondary compensation pressure equalizing by-pass in the compensation fluid duct just described (between said duct and a negligible pressure area) is necessary. Also, because of differences in responsiveness of governed machines to control impulses, the secondary compensation by-pass should be adjustable. The secondary compensation by-pass (designated generally C2) is shown at a high point in the system which conveniently can be at the upper end of the hollow compensation piston 83, so that air trapped in the fluid or gas liberated from the same will be discharged by buoyancy thereof. Adjustment of the secondary compensation by-pass may be secured by a threaded needle valve pin 110 in a boss 111 of the block 3 and having a conical end projecting into the bore 84 of the piston 83, leaving a small gap between said conical end and the bore. Lateral openings 112 in the boss, communicating with an enlarged space 113 around the needle valve pin, permit free flow of fluid between said space and a permanently maintained reservoir space S6 in the speeder case. The openings 112 are always submerged and a supply of hydraulic fluid is retained by an upstanding barrier wall 114 and contiguous walls of the speeder case. Spill-over from the reservoir S1 is suitably discharged into the power case sump by gravity through appropriate openings, including an opening 115 in the floor of the speeder case around the ball head mechanism. The duct 92 may be extended above the floor of the reservoir space S6, if desired, so that solid matter collecting on such floor will not drain into the servo-motor.

To charge the system with hydraulic fluid, a special removable filler section of the speeder case cap (not illustrated) is provided over the reservoir S6, and a strainer screen 116 extends upwardly from the barrier 114 and divides the region of the speeder case at the left of the barrier from the main portion of the speeder case. A settling basin for the reservoir extends below the openings 112 of the boss 111 so that foreign matter is trapped below the openings 112.

*Operation (preferred form).*—Assuming that the shaft 5 is connected to a prime mover running at constant speed (normal, as determined by speed setting through the speeder spring) the fly ball mechanism maintains the pilot valve plunger centered so long as that condition obtains (steady state). If a certain percentage of the load on the prime mover is dissipated, then the speed increases proportionately, and the pilot valve plunger will be raised by outward movement of the fly ball weights, thus opening the ports 36 and permitting the discharge of regulation fluid from R to the sump. Arrows on the parts indicate the direction of movement of the parts and hydraulic fluid in case of decrease in load and resulting increase in speed. Constant pressure at P2 then overcomes the differential between P2 and R1, lowering the power piston of the servo-motor and reducing the prime mover speed through the stem 87 and connected mechanism. Eventually this action of the servo-motor would be checked by return movement of the fly balls toward original position referred to as the prime mover slows down, thus closing the ports 36, but by that time the governed machine would be running at under speed or below normal. As soon as the piston 80 starts downwardly, compensation fluid is drawn from C1 into C, tending to lower the receiving compensation piston 50 and stretching the spring 55. A negligible volume of hydraulic fluid moves inwardly through the secondary compensation by-pass C2 during this action. The spring 55 pulls downwardly on the pilot valve plunger, thus restraining upward movement of the latter. The restraining action (primary compensation) on the plunger, although exerting only a small percentage of the force exerted thereon by the speeded fly-balls, causes the fly balls to return sufficiently quickly to a position closing the ports 36 so that an underspeed condition of the prime mover does not take place. As the prime mover, under the correcting influence of the servo-motor, returns toward normal speed, it is necessary to remove the restraining influence of the spring 55 on the valve plunger in unison with the return to normal speed on part of the prime mover—for otherwise a reverse action of the pilot valve would take place at least temporarily, such as when speed acceleration is needed. In other words, isochronous governing would not be accomplished. Secondary compensation, necessary for isochronous governing, is accomplished by by-passing fluid from the sump reservoir S6 into the duct connecting the actuating and receiving compensation pistons, thus gradually relieving the suction force generated by the stressed spring 55. The spring 55, in returning to unstressed condition, lifts the piston 50, finally establishing a neutral or non-acting pressure condition in the compensation fluid duct. The leakage through the secondary compensation by-pass is regulated in accordance with the ability of the governed machine to respond to corrective impulses by the servo-motor; and once the needle valve 110 has been adjusted to suit the machine on which the governor is installed or with which connected, it needs no further attention.

When load on the prime mover is increased over normal and its speed thereby decreases, the action of the governor is the reverse of that just described. The pilot valve plunger is then pressed down by the speeder spring as the fly ball weights move inwardly. This opens the ports 35 to the interior of the sleeve 30 and subjects the lower side of the piston 80 to sufficient pressure to lift it, the fluid moving from P1 through ports 35 and 34, space R, ducts 94, etc. to R1. The actuating compensation piston 83 then tends to pump fluid to the space C1 beneath the receiving compensation piston 50, and the latter tends to compress the spring 55, forcing upwardly on the pilot valve plunger and restraining its downward movement. As the pilot valve plunger returns to normal position upon initiating the speed-corrective cycle, the spring expands to unstressed condition, forcing fluid from the compensation fluid duct at the by-pass ports 112.

It should be remarked that the efficacy of placing a relatively light restraining influence on the primary weighing element (e. g. fly-ball mechanism) to effect compensation in a hydraulically compensated governor has already been demonstrated and recognized in this art. The principle as embodied in one form of the present governor (isochronous governor such as illustrated) has been found by actual extensive tests to produce surprisingly good results under widely varying conditions of use. By reason of the constant relative rotation maintained between both the pilot valve plunger and receiving compensating piston and their guide bores during operation of the governor, it will be seen that said plunger and piston are always in readiness to be moved axially, with no possibility of sticking due to accumulation of foreign matter (as from the oil) in the microscopically small clearance spaces between the sliding guides. Immediate responsive operation of the governor to influences calling for changes in a condition of the governed machine or mechanism is thus assured.

The weighing element can be responsive to any force factors other than speed,—for instance, fluid or current pressure or flow, gravity, etc. It is unnecessary to illustrate the modifications suggested above in view of the state of the art.

In the arrangement shown there are very few close manufacturing tolerances to maintain axially of the pilot valve plunger 20, sleeve 30, and the compensation piston assembly. The length of the neck portion 24 of pilot valve plunger 20, i. e. spacing of lands at each end of the neck, and the spacing of the cooperating port edges (ports 35 and 36) in the sleeve are critical, but no other very close limits in an axial direction need be maintained.

If the receiving compensation piston and its cylinder are provided with travel limiting by-pass ports (as in Fig. 6, for instance) then some additional close axial tolerances as to ports and spring length are necessary; but the travel of the receiving compensation piston can just as well be limited by restricting the volume of hydraulic fluid displaced to move said compensation piston and in other ways. In the form shown in Fig. 1, close limits in length of the spring are unimportant, and the spring 55 can be made much shorter than as shown.

It will also be seen that it is unnecessary to maintain concentricity of the cylinder bores for the pilot valve plunger and the receiving compensation piston, and that if these bores are of different diameters (as in order to increase the diameter of the receiving compensation piston relative to pilot valve plunger diameter, e. g. in providing travel limiting by-passes or for any other reason) the counterboring operation thereby necessitated in the sleeve 30 or counterpart thereof is much less expensive than would be the case if the plunger and piston were rigidly connected.

Modified form

Figure 6:
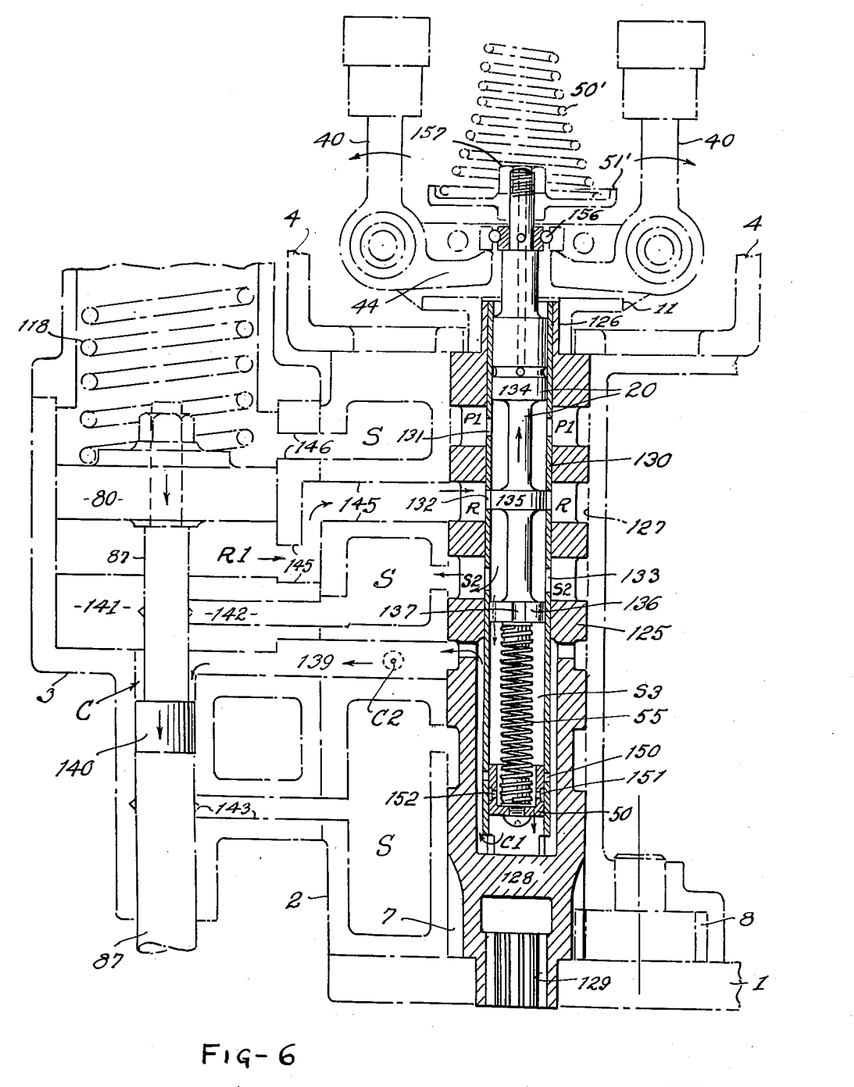
Fig. 6 is a view similar to Fig. 1 showing a modified general arrangement, the new parts only being shown in full lines.

Referring to the governor mechanism shown in Fig. 6, the view illustrates mainly a different manner of obtaining, during steady state conditions, relative rotation between the unitary pilot valve plunger and receiving compensating piston assembly and the guide bores in which said plunger and piston operate. A hydraulically acting restraining-force-limiting means during axial movement of the receiving compensation piston is also shown. The arrangement of parts illustrated in broken lines is schematic, mainly in order better to illustrate the modified arrangement in one view and to emphasize only the parts which contribute directly to the advantages derived by the present invention.

In Fig. 6, the counterparts of the arrangement according to Fig. 1, so far as strictly analogous, are indicated by the same reference characters notwithstanding some differences in form and relative position. The principal differences between the two arrangements are that the servomotor has a single acting piston 80 (with a suitable return spring 118 for moving the control rod 87 in the direction to reduce speed, i. e. downwardly), and that the fly-ball head is adapted to be driven directly—i. e. without a gear train—by the driving element of the prime mover to which the governor may be connected to control speed.

As shown, the ball head casting 11 is secured to the upper end of a hollow driving shaft 125 at a reduced upper end portion 126 thereof which may have driving "flats" for engaging complementary internal faces of the hub of the ball head casting 11. The shaft 125 corresponds to the "pilot valve bushing" of governors of the type shown, and is fixed against longitudinal movement as by shouldered engagement with the base and speeder case. The shaft 125 is turnable in a vertical cylindrical bore 127 of the power case. The lower end of the hollow shaft 125 is closed (or plugged) as at 128, and below the closure is a driving socket 129 shown as having internal spline teeth for coupling the shaft 125 with a shaft of a prime mover. Externally, the lower end of the hollow shaft 125 has pump gear teeth cut thereon corresponding, so far as fluid pumping is concerned, to gear 7 of Fig. 1 (so indicated). Gear 7 meshes with a complementary pump gear 8, and the pump delivers fluid at constant pressure to a space P1 formed as a circumferential and radially through passage in the wall of the hollow shaft 125 near its upper end. Duct means etc., (not shown), conveying fluid to the space P1 and maintaining constant pressure in said space may be arranged essentially as described in connection with Figs. 1 to 4.

The part in Fig. 6 which corresponds, so far as valving functions are concerned, to the sleeve 30 of Fig. 1 is a sleeve 130 which is pressed into the hollow shaft 125 downwardly against the wall or closure 128 thereof. The sleeve 130 has lateral passages 131, 132, 133 leading from its interior and respectively in the order mentioned into the spaces P1, R and S2, formed similarly to the space P1 in the hollow shaft 125 or between said shaft and its guide bore 127. Except at said lateral passages and others described below, the sleeve 130 makes hydraulic fluid sealing peripherally continuous contact with the adjacent interior surfaces of the hollow shaft 125.

The pivot valve plunger 20 extends into sliding contact with the longitudinal bore of the sleeve 130 to control the hydraulic system essentially as in the case of the pilot valve plunger of Fig. 1, but in Fig. 6 the plunger is prevented from turning as by the speeder spring through its seat collar 51', which, together with an inner race ring of a ball bearing 156, is clamped to the upper end of the pilot valve plunger as by a nut 157. The fly ball arms bear upwardly on the outer race ring of said ball bearing. Thus, positive relative rotation between the pilot valve plunger and the sleeve 130 is assured during operation of the governor.

The lateral openings 131 connect the constant pressure space P1 with the interior of the sleeve 130 between lands 134 and 135 of the plunger. The openings 132 function as valve ports, and are closed by the land 135 during steady state operation. Below the land 135, the interior of the sleeve 130, even beyond the plunger for a considerable distance, is in constant communication with the sump at S2 through the sleeve openings 133. A plunger-guiding land portion 136 of the plunger has vertical relief grooves 137 so that the space S3 within the sleeve 130 below the land portion 136 is also in constant communication with the sump through the openings 133.

The receiving compensating piston 50 works in the cylindrical bore of the sleeve 130 below the plunger land portion 136. Thus, as in the Fig. 1 construction, the upper part of the compensation piston cylinder is never subjected to more than negligible (sump-head) pressure, (cf. S3 on Fig. 1). Note: S2 and S3 in Fig. 1 serve respectively to connect regulating fluid passage R and the upper part of the receiving compensation piston cylinder to the sump, whereas, in the arrangement according to Fig. 6, S2 serves both said purposes, and S3 is merely a permanent extension of S2.

The open space around the lower end of the sleeve and which is in open communication with the receiving compensation piston cylinder space C1, below said piston, is in constant communication with the primary or actuating compensating piston cylinder (space C at the left of Fig. 6) through a compensating fluid duct 139 formed partly in the wall of the hollow shaft 125, as clearly shown.

The actuating compensation piston can conveniently be formed on or attached to the regulating rod 87 as at 140, and the upper end of the cylinder space C closed against communication with the servo-motor power cylinder space R1 by a fixed block 141 dividing said cylinder spaces. The hole in the block which slidably receives the rod 87 can be vented to the sump at 142, so that regulation pressure in the power cylinder cannot affect the pressure in the compensation fluid duct. A similar sump vent is provided at 143 below the actuating compensation piston 140, so that the actuating compensation piston will never pump air into the hydraulic system from around the regulating rod.

Communication between the regulation pressure space R and the power piston cylinder space R1 is afforded by a duct 145. The power cylinder space above the power piston can communicate with the sump through a duct 146.

The pilot valve plunger and the receiving compensation piston are connected by torque transmitting extensible and contractible resilient means as before,—e. g. spring 55 and self gripping threaded connections to the parts as already described, and a regulatable secondary compensation by-pass may be positioned as at C2 in the duct 139.

*Operation (modified form)*.—It will be apparent that when the fly-ball arms move outwardly from normal position (that illustrated), against the speed adjusting, restraining force of the speeder spring, the pilot valve will be raised, unsealing the sleeve ports 132 by upward movement of the land 135. This permits flow of regulation pressure fluid from R1 through the duct 145 to the sump through S2, thereby enabling the servomotor spring 118 to depress the regulating rod 87 and slow down the speed of the prime mover. The suction action of the actuating compensation piston 150, acting through the duct 139 on the receiving compensation piston, tends to pull downwardly on the piston 50, thereby placing primary compensating restraint on the valve plunger. In the cycle just outlined the movement of parts and fluid is as indicated by the arrows on the parts and ducts.

Reverse action of the governor will be understood from the preceding description. The parts and fluid will be moved in directions opposite those indicated by the arrows.

If it is desired to limit the movement of the receiving compensation piston,—e. g. whereby to limit the restraining force on the pilot valve plunger or so that, for instance, the effective displacement of the actuating compensation piston and cylinder can be larger than necessary, or whereby to insure sufficient compensation displacement irrespective of the amount of opening of the secondary compensation by-pass,—then, as illustrated, lateral passages 150 can be provided in the sleeve 130 in position normally to be closed by the receiving compensation piston 50, together with cooperating by-pass valve openings and passages in the piston. The restraint-limiting means as to the piston 50 comprise, as shown, the upper skirt portion of the piston and a peripheral groove 151 in the piston together with radial passages 152 leading from the groove into the hollow interior of the piston. On the downward compensating movement of the receiving compensating piston 50 (opposing or restraining) upward movement of the pilot valve plunger) the piston 50 will only travel until the upper rim of the piston skirt slightly uncovers or "cracks" the ports 150, for, thereupon, further movement will be stopped by by-passage of fluid at sump pressure into the compensation fluid duct (through S2, 137 and S3). On the reverse movement of the piston 50, the groove 151 cracks the ports 150 after a short stroke of said piston and permits sufficient flow from the compensation fluid duct into the sump to check further movement. Aside from the above described differences in arrangement and operation the construction according to Fig. 6 is, or can be, the same as in Fig. 1, and the described advantages resulting from the resilient torque transmitting connection between the pilot valve plunger and receiving compensation piston are obtained.

Certain features herein disclosed are claimed in my copending application Serial No. 350,255, filed concurrently herewith.

I claim:

1. In combination with a valve plunger and receiving compensation piston combination for a governor of the type which acts to effect regulation hydraulically wherein the plunger and piston are adapted and arranged to move axially along substantially aligned cylindrical guides while rotating relatively thereto, a torque-transmitting means of variable length coupling said piston and plunger and co-rotatively anchored to each.

2. A pilot valve plunger and receiving compensation piston assembly for a governor wherein a primary weighing element acts upon the plunger to cause a regulating valving operation to be initiated and the piston acts compensatingly on the plunger through hydraulic means to oppose or restrain its aforesaid movement; said assembly being characterized in that the plunger and piston are adapted to operate axially in substantially aligned guide bores while rotating relatively thereto, and the two are connected by a coil spring having its respective ends secured to the plunger and piston in a manner to transmit torque and reversible axial force from one to the other.

3. A governor of the type having a primary weighing element which moves in dependency upon changes in a condition of an associated apparatus to be governed, a pilot valve plunger connected to said element and in turn controlling a hydraulic system in a manner tending to maintain said condition constant, said system including a piston which is adapted to restrain the plunger axially during change in condition of the hydraulic system; means constituting approximately aligned cylindrical guides for said piston and plunger, and means for rotating the piston and plunger relative to their guides, said last mentioned means including resilient means mechanically interconnecting said piston and plunger for co-rotative movement but enabling relative axial movement of the plunger and piston.

4. In a fly-ball governor having a valve plunger operatively connected with the fly-ball head and adapted to be moved along a cylindrical guide having lateral ports for hydraulically effecting the regulation of a prime mover through the action of a hydraulic fluid on a servo-motor, and wherein a quantity of compensating fluid is displaced by the servo-motor to cause a compensating piston to be moved appropriately in a manner to restrain axial movement of the plunger, approximately aligned cylindrical guides for the plunger and piston, means for causing relative rotation between the plunger and its guide during the entire operation of the governor, and a torque transmitting connection of resiliently variable axial extent between the piston and plunger and capable of restraining endwise movement of the plunger in opposite directions when the piston is moved in said directions.

5. In a governor of the known type in which a rotary weighing element is connected to a pilot valve plunger of a hydraulic servo-motor in a manner to reciprocate the plunger and thereby initiate regulating operations of the servo-motor and wherein the plunger is continuously turned in a single direction in a fixed pilot valve sleeve by the weighing element during the entire operation of the governor; the combination of a compensation piston/cylinder couple approximately aligned with the valve sleeve and having one of its component elements fixed and the other rotatable, means connecting said plunger with said rotatable couple element for effecting continuous rotation of the latter during governor operation, said connecting means also yieldably linking said plunger to said rotatable couple element in such manner that the couple element may impose yieldable restraining compensation effect upon axial movement of said plunger, and a hydraulic coupling between the servo-motor and the piston/cylinder couple, said hydraulic coupling being constructed and arranged relative to the servo-motor and piston/cylinder couple so that the compensating action of the piston/cylinder couple is always a function of servo-motor movement.

6. In a governor having a rotary weighing element which controls a hydraulic regulating system through endwise movement of a pilot valve plunger connected with the weighing element and is rotated and reciprocated thereby wherein the valve plunger works in a fixed valve sleeve having longitudinally spaced valve ports controlled by spaced upper and lower lands on the valve plunger which normally substantially seal said ports, one of the ports being a constant pressure port and wherein the weighing element includes a body having a hollow portion for which an upper peripheral surface and an axially disposed shoulder surface of the valve sleeve constitute radial and thrust bearings respectively in running contact with the hollow portion of said body; lubricating means for the bearing comprising a duct extending axially from the land which closes the pressure port and which is in constant communication with said port, the upper end of the duct discharging into a running-fit clearance space portion of the plunger with respect to the sleeve, and a passage through the wall of the sleeve in the horizontal plane of one of the radial and thrust bearing surfaces of the sleeve for introducing fluid carried by the duct to said clearance space.

7. In a governor wherein a generally upright reciprocable valve plunger and cooperating valve sleeve control a servo-motor having piston and cylinder parts operating on a generally upright axis for regulation of a governed device, and wherein compensation is effected through hydraulic means; the combination wherein said means includes a fixed hollow piston parallel with the servo-motor axis and a cooperating cylinder formed in a plunger element of the servo-motor, and a compensation fluid duct of which the hollow piston is a part, said duct extending generally downwardly from the upper end of the hollow piston, a piston/cylinder couple operatively connected to one of the aforesaid elements of the pilot valve below the latter and below the horizontal plane of the upper end of the hollow piston, compensation being effected in part by fluid moved in the duct and applied to an element of said piston/cylinder couple, and a secondary compensation bleeder associated with the upper end of said hollow piston and venting the duct.

8. In a governor of the known type in which a rotary weighing element is mounted on an axially fixed sleeve which rotates continuously during operation of the governor, which sleeve together with a non-rotary valve plunger in the sleeve constitute a pilot valve of a hydraulic servo-motor wherein the weighing element moves the plunger axially in the sleeve in opposite directions to initiate regulating movements of the servo-motor and wherein compensation is effected hydraulically as a function of such regulating movements of the servo-motor through the intermediary of a compensation fluid duct, a cylinder in the sleeve beyond one end of the plunger, a piston in the cylinder, said cylinder at one end of the piston constituting one effective end of the compensation fluid duct, and means elastically yieldable in opposite directions from unstressed condition, said means connecting the piston to the valve plunger yieldably to restrain axial valving movements of the plunger, said means being connected to the plunger and piston in a manner to cause the piston to be maintained against rotation in its cylinder during the entire operation of the governor.

ALBERT KALIN.